United States Patent
Zawacki

(10) Patent No.: US 9,927,086 B2
(45) Date of Patent: Mar. 27, 2018

(54) LOW-BEAM HEADLIGHT ASSEMBLY WITH HYBRID LIGHTING FUNCTION

(71) Applicant: GM GLOBAL TECHNOLOGY OPERATIONS LLC, Detroit, MI (US)

(72) Inventor: Jeffrey T. Zawacki, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 15/130,349

(22) Filed: Apr. 15, 2016

(65) Prior Publication Data
US 2017/0299138 A1    Oct. 19, 2017

(51) Int. Cl.
F21V 1/00    (2006.01)
F21S 8/10    (2006.01)

(52) U.S. Cl.
CPC ......... *F21S 48/1747* (2013.01); *F21S 48/115* (2013.01); *F21S 48/1109* (2013.01); *F21S 48/1145* (2013.01); *F21S 48/1195* (2013.01)

(58) Field of Classification Search
USPC ..................................................... 362/509
See application file for complete search history.

(56) References Cited

U.S. PATENT DOCUMENTS

| 7,150,552 B2 * | 12/2006 | Weidel | B60Q 1/085 |
| | | | 362/464 |
| 2016/0084462 A1 * | 3/2016 | Suwa | B62J 6/02 |
| | | | 362/511 |

\* cited by examiner

*Primary Examiner* — Rafferty Kelly
(74) *Attorney, Agent, or Firm* — Quinn IP Law

(57) ABSTRACT

A low-beam headlight assembly includes a transparent outer lens, an optical reflector housing, and first and second lighting sources. The reflector housing has a reflective inner surface configured to reflect incident light through the transparent outer lens. The lighting sources collectively generate the incident light. The optical reflector housing reflects the incident light from the second lighting source through a designated region of the transparent outer lens to enhance a hot spot adjacent to a beam cut-off zone of a low-beam lighting pattern from the first lighting source. The low-beam headlight assembly may have a vertical height of less than about 20 mm, or about 10 mm and 15 mm. The first lighting source may include light-emitting diodes, while the second lighting source may include a laser device such as a laser diode. A vehicle includes a body and a headlight assembly that includes the low-beam headlight assembly.

14 Claims, 1 Drawing Sheet

LOW-BEAM HEADLIGHT ASSEMBLY WITH HYBRID LIGHTING FUNCTION

TECHNICAL FIELD

The disclosure relates to a low-beam headlight assembly that includes a hybrid lighting function.

BACKGROUND

Headlight assemblies are used to improve visibility, both of a path of travel and of an object to which the headlight assembly is attached. For road vehicles in particular, high-beam and low-beam headlight assemblies are used to illuminate a road surface and the surrounding area with different relative intensities, with emitted light from the high-beam headlight assembly being substantially brighter and more centrally focused than light emitted by the low-beam headlight assembly. High-beam and low-beam headlight assemblies, each of which may use halogen bulbs, light-emitting diodes, or other suitable high-lumen lighting sources, may be combined into a single lamp housing or separately housed.

SUMMARY

A low-beam headlight assembly is disclosed herein that provides a hybrid lighting function. In a particular embodiment, the low-beam headlight assembly includes a transparent outer lens, an optical reflector housing, and first and second lighting sources. The optical reflector housing includes a reflective inner surface that is configured to reflect incident light from the lighting sources and direct the reflected incident light through the transparent outer lens. The second lighting source is configured and positioned so as to maintain a sufficiently high level of luminous flux over a designated region of a low-beam lighting pattern from the first lighting source, including a hot spot adjacent to a beam cut-off zone of the low-beam lighting pattern.

The low-beam headlight assembly disclosed herein is low profile, i.e., has a vertical height of less than about 20 mm, or between about 10-15 mm in other embodiments. The "hybrid" nature of the low-beam function is achieved via a targeted use of the second lighting source to maintain the high luminous flux in the hot spot and beam cut-off zone. The present approach thus allows for the use of a greater amount of light from the first lighting source to enhance visibility and detection of objects located in the path of travel of any vehicle or other device using the low-beam assembly.

The first lighting source may include a plurality of high-lumen light-emitting diodes (LEDs), e.g., four or five LEDs, or any other desirable source of light suitable for generating dispersed light forming the beam pattern of a typical low-beam function. The second lighting source may be a concentrated high-lumen device, e.g., a laser device such as a laser diode, which is oriented in such a way as to "paint" or irradiate only a designated area of an inside surface of the transparent outer lens corresponding to the hot spot adjacent to a beam cut-off region of the low-beam lighting pattern. An intended result of the present configuration is maintenance of high luminous flux and light distribution throughout the low-beam lighting pattern with improved obstacle detection and color temperature of emitted light. Additionally, ultra-thin or low-profile configurations of the low-beam assembly are enabled that may enable styling options that are precluded by larger conventional headlight assemblies.

In a particular embodiment, the low-beam headlight assembly includes a transparent outer lens, an optical reflector housing having a reflective inner surface configured to reflect incident light through the transparent outer lens, and first and second lighting sources that are collectively configured to generate the incident light. The optical reflector housing is configured to direct the incident light from the second lighting source through a designated region of the transparent outer lens to enhance a hot spot adjacent to the beam cut-off zone of a low-beam lighting pattern from the first lighting source.

A vehicle is also disclosed herein that includes a body and a headlight assembly having the low-beam headlight assembly described above.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

DETAILED DESCRIPTION

Figure 1:
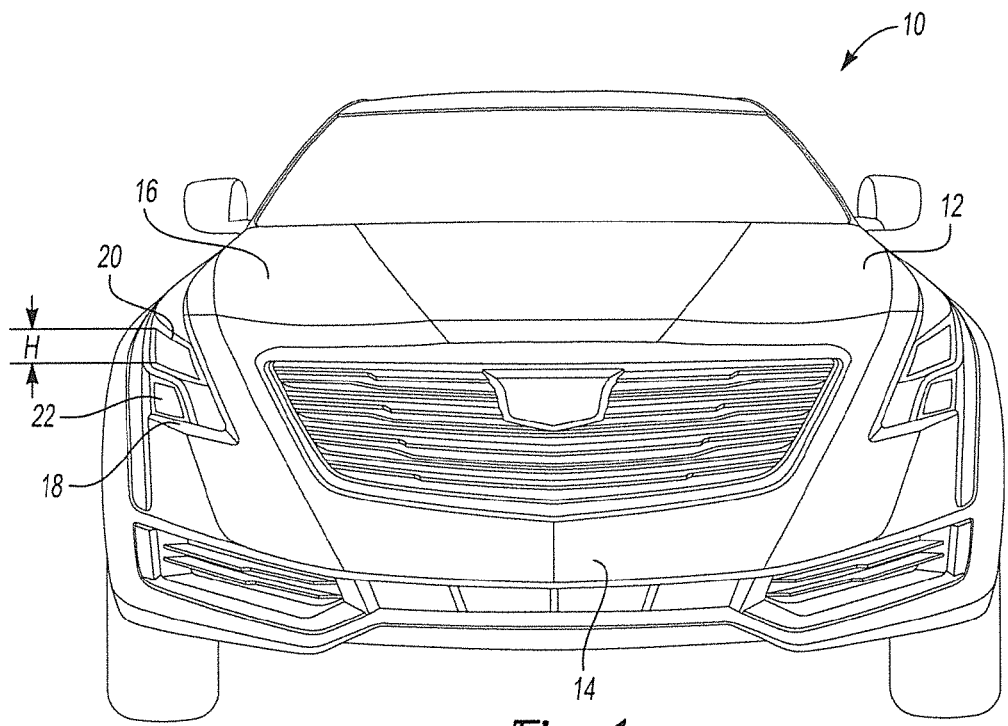
FIG. 1 is a schematic front perspective illustration of an example vehicle having a low-beam headlight assembly with a hybrid lighting function as set forth herein.

Referring to the Figures, wherein like numerals indicate like parts throughout the several views, an example vehicle 10 is shown in FIG. 1 having a headlight assembly 18. Aspects of the present disclosure are directed to use in a motor vehicle and traditional vehicular headlight applications. However, the headlight assembly 18 disclosed herein may be used in conjunction with any mobile platform, including but not limited to passenger vehicles, industrial vehicles, all-terrain vehicles, motorcycles, farm equipment, boats, trains, and aircraft. For illustrative consistency, the headlight assembly 18 will be described hereinafter in the context of a road vehicle without limiting the scope of the disclosure to such an embodiment.

The vehicle 10 of FIG. 1 may include a body 12, with the body 12 defining or including a front end 14 and a hood 16. The headlight assembly 18, which may be configured for use adjacent to the hood 16 as shown in a typical front headlight application, houses a low-beam headlight assembly 20 and, in some embodiments, a conventional high-beam headlight assembly 22. While not described herein, the headlight assembly 18 may be optionally configured to provide a position lighting function and a daytime running light (DRL) function, both of which are well known in the art. Such additional functions may continue to be used with the presently disclosed headlight assembly 18, whether such functions are housed together with the headlight assembly 18 or separately housed at an adjacent position.

The low-beam headlight assembly 20 of FIG. 1 is low profile as noted above, i.e., has a vertical height (H) of less than about 20 mm, or between about 10-15 mm in other embodiments. The low-beam lighting function provided by the low-beam headlight assembly 20 is achieved using two separate lighting sources to maintain a high luminous flux over a designated portion of a low-beam lighting pattern emitted by the low-beam headlight assembly 20, as will now be described with reference to FIG. 2.

Figure 2:
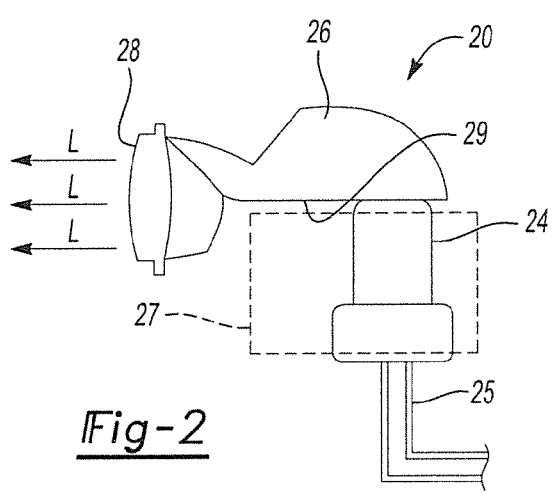
FIG. 2 is a schematic plan view illustration of an example diode laser, transparent outer lens, and optical reflector housing usable as part of the low-beam headlight assembly shown in FIG. 2.

FIG. 2 schematically depicts the low-beam headlight assembly 20 in a plan view. The low-beam headlight assembly 20 includes first and second lighting sources 24 and 27, an optical reflector housing 26 having a reflective inner surface 29, and a transparent outer lens 28, e.g., clear or non-tinted glass or impact-resistant plastic, through which reflected incident light (arrows L) from the first and second lighting sources 24 and 27 is emitted. The hybrid low-beam function is achieved by placing the respective first and second lighting sources 24 and 27 within a lighting cavity (not shown) defined in part or whole by the optical reflector housing 26 and the transparent outer lens 28. The second lighting source 27 includes electrical leads 25 connected to an auxiliary voltage supply (not shown). The same voltage supply may power the first lighting source 24 in the conventional manner.

Light from the second lighting source 27 is directed at a predetermined or designated area of the transparent outer lens 28 via reflection off of the reflective inner surface 29, e.g., a polished or chrome plated surface. As will be appreciated by those of ordinary skill in the art, this requires the optical reflector housing 26 and reflective inner surface 29 to be configured to reflect incident light from the second lighting source 27 through a designated region of the transparent outer lens 28 so that such light ultimately irradiates a predetermined zone or area of an inside surface of the transparent outer lens 28 corresponding to a hot spot of a low-beam lighting pattern emitted by the first lighting source 24 as explained below. This reflection maintains a sufficiently high level of luminous flux over a specific portion of the low-beam lighting pattern. In turn, the present approach allows for the use of more of the light from the first lighting source 24 to enhance object detection in a path of travel of the vehicle 10 of FIG. 1.

The first lighting source 24 of FIG. 2 may be embodied as any conventional low-beam lighting source, such as a plurality of light-emitting diodes (LEDs), e.g., four or five LEDs, or any other desirable source of light such as a halogen bulb. The second lighting source 27 is a concentrated high-lumen lighting device, e.g., a laser diode as shown schematically, oriented so as to irradiate or "paint" a predetermined region of the transparent outer lens 28. As is well known in the art, a laser diode is an electrically-pumped semiconductor device. Optically-pumped laser devices or quantum cascade lasers may also be used in the alternative within the scope of the disclosure, as may be any other lighting source having sufficiently high intensity that can be focused as set forth below with reference to FIG. 3 to provide the desired hot spot and cutoff enhancement function necessary to the proper function of the low-profile configuration shown in FIG. 1.

Figure 3:
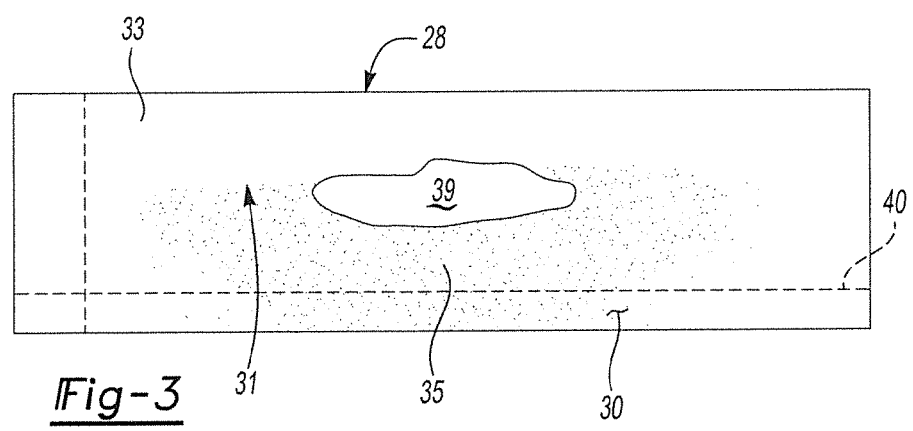
FIG. 3 is a schematic depiction of different lighting regions enabled by the hybrid lighting function of the low-beam headlight assembly shown in FIGS. 1 and 2.

FIG. 3 is a schematic depiction of the transparent outer lens 28 of FIG. 2 viewed from the inside of the low-beam headlight assembly 20, i.e., viewing a road surface 30 through the transparent outer lens 28. Line 40 represents the horizon. Specifically, FIG. 3 depicts lighting regions of the road surface 30 and surrounding area as a low-beam lighting pattern 35 and an unlit region 33. A boundary or transition between the low-beam lighting pattern 35 and the unlit region 33 is referred to herein and known in the general art as the beam cut-off region 31.

Immediately adjacent to the beam cut-off region 31 is a predetermined hot spot 39 of a predetermined shape, e.g., a single elongated, irregularly shaped area as shown that is contiguous on one side with the beam cut-off region 31. The second lighting source 27 is positioned and configured to enhance the hot spot 39 along the beam cut-off region 31. An intended result of the present configuration is the provision of high luminous flux and a desired light distribution in the low-beam lighting pattern 35, with improved obstacle detection and color temperature of the light (arrows L) emitted by the low-beam headlight assembly 20.

Additionally, the use of the second lighting source 27 in the manner described above allows the vertical height (H) of the low-beam headlight assembly 20 as viewed from the front end 14 of the vehicle 10 of FIG. 1 to be greatly reduced relative to conventional low-beam headlight assemblies. In some embodiments, the height (H) shown in FIG. 1 may be as little as about 10 mm, which can greatly improve packaging efficiency while allowing for unique styling. However, given the ultra-thin profile of the low-beam headlight assembly 20, it may be difficult, absent the concentrated use of the second lighting source 27 of FIG. 2, to provide a desired lighting intensity at key zones of the low-beam lighting pattern 35 of FIG. 3 for a vehicular low-beam function. The targeted use of a laser diode or other suitable lighting source as the second lighting source 27 of FIG. 2 to enhance the hot spot 39 along the cut-off region 31 as shown in FIG. 3 thus solves a particular lighting need.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A low-beam headlight assembly comprising:
a transparent outer lens;
an optical reflector housing having a reflective inner surface operable to reflect incident light through the transparent outer lens;
a first and a second lighting source collectively operable to generate the incident light;
wherein the optical reflector housing is operable to direct the incident light from the first light source to define a low-beam lighting pattern having a hot spot at least partially bounded by a beam cutoff zone;
wherein the optical reflector housing is operable to direct the incident light from the second lighting source through a designated region of the transparent outer lens to enhance the hot spot adjacent to the beam cut-off zone of the low-beam lighting pattern from the first lighting source; and wherein the low-beam headlight assembly has a vertical height of less than about 20 mm.

2. The low-beam headlight assembly of claim 1, wherein the vertical height is between about 10 mm and 15 mm.

3. The low-beam headlight assembly of claim 1, wherein the first lighting source includes a plurality of light-emitting diodes.

4. The low-beam headlight assembly of claim 1, wherein the second lighting source includes a laser device.

5. The low-beam headlight assembly of claim 4, wherein the laser device is a laser diode.

6. A low-beam headlight assembly comprising:
   a transparent outer lens;
   an optical reflector housing having a reflective inner surface; and
   a first and a second lighting source collectively operable to generate incident light;
   wherein the low-beam assembly has a vertical height of less than about 20 mm, the first lighting source is a plurality of LEDs operable to generate a low-beam lighting pattern, and the second lighting source is a laser diode configured to maintain a high luminous flux over a designated region of the low-beam lighting pattern as a second part of the reflected incident light; and
   wherein the optical reflector housing is operable to direct the incident light from the first light source to define the low-beam lighting pattern, with the low-beam lighting pattern having a hot spot at least partially bounded by a beam cutoff zone;
   wherein the optical reflector housing is operable to direct the incident light from the second lighting source through a designated region of the transparent outer lens to increase an intensity of the hot spot.

7. The low-beam assembly of claim 6, wherein the vertical height is between about 10 mm and 15 mm.

8. A vehicle comprising:
   a body; and
   a headlight assembly having a low-beam headlight assembly connected to the body, wherein the low-beam headlight assembly includes:
   a transparent outer lens;
   an optical reflector housing having a reflective inner surface operable to reflect incident light through the transparent outer lens; and
   a first and a second lighting source collectively operable to generate the incident light;
   wherein the optical reflector housing is operable to direct the incident light from the first light source to define a low-beam lighting pattern having a hot spot at least partially bounded by a beam cutoff zone;
   wherein the optical reflector housing is operable to direct the incident light from the second lighting source through a designated region of the transparent outer lens to enhance the hot spot adjacent to the beam cut-off zone of the low-beam lighting pattern from the first lighting source; and
   wherein the low-beam headlight assembly has a vertical height of less than about 20 mm.

9. The vehicle of claim 8, wherein the headlight assembly includes a high-beam headlight assembly proximate the low-beam headlight assembly.

10. The vehicle of claim 8, wherein the vertical height is between about 10 mm and 15 mm.

11. The vehicle of claim 8, wherein the first lighting source includes a plurality of light-emitting diodes.

12. The vehicle of claim 8, wherein the second lighting source includes a laser device.

13. The vehicle of claim 8, wherein the laser device is a laser diode.

14. The vehicle of claim 8, wherein the first lighting source includes a plurality of light-emitting diodes and the second lighting device is a laser diode.

\* \* \* \* \*